United States Patent
Gennesseaux et al.

(10) Patent No.: US 6,199,842 B1
(45) Date of Patent: Mar. 13, 2001

(54) PNEUMATICALLY CONTROLLED, ACTIVE HYDRAULIC ANTI-VIBRATION SUPPORT

(75) Inventors: André Gennesseaux, Conie Molitard; Jean-Luc Gastineau, St-Jean-Froidmentel; Sylvain Durand, Villorceau, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/375,091

(22) Filed: Aug. 16, 1999

(30) Foreign Application Priority Data

Aug. 31, 1998 (FR) .................................... 98 10869

(51) Int. Cl.⁷ ................................ F16F 5/00; F16M 7/00
(52) U.S. Cl. ...................................... 267/140.13; 267/219
(58) Field of Search ..................... 267/140.13, 140.11, 267/140.12, 140.14, 140.15, 219, 35, 122, 141.2; 248/636, 638, 562; 180/312, 902

(56) References Cited

U.S. PATENT DOCUMENTS

| 4,638,983 | 1/1987 | Idigkeit et al. | 267/140.1 |
|---|---|---|---|
| 4,693,455 | 9/1987 | Andrä | 267/140.1 |
| 5,209,462 | 5/1993 | Le Fol et al. | 267/219 |
| 5,215,293 | 6/1993 | Muramatsu et al. | 267/140.14 |
| 5,620,168 | * 4/1997 | Ohtake et al. | 267/140.13 |

FOREIGN PATENT DOCUMENTS

| 38 01 108 | 7/1989 | (DE) . |
|---|---|---|
| 0 262 544 A2 | 6/1988 | (EP) . |
| 9-317815 | 12/1997 | (JP) . |

* cited by examiner

Primary Examiner—Christopher P. Schwartz
Assistant Examiner—Pamela J. Rodriguez
(74) Attorney, Agent, or Firm—Marshall, O'Toole, Gerstein, Murray & Borun

(57) ABSTRACT

An anti-vibration support is provided having two rigid frames linked to one another by an elastomer body which is applied against a rigid partition to delimit a hydraulic working chamber connected to a compensating chamber by a throttled passage. The rigid partition has a flexible membrane inserted between the working chamber and a pneumatic chamber controlled by a solenoid. The solenoid is mounted on a support block which also incorporates a pneumatic coupling and an electrical connector, this support block having an annular flange which delimits the pneumatic chamber and clamps the flexible membrane against the rigid partition.

11 Claims, 1 Drawing Sheet

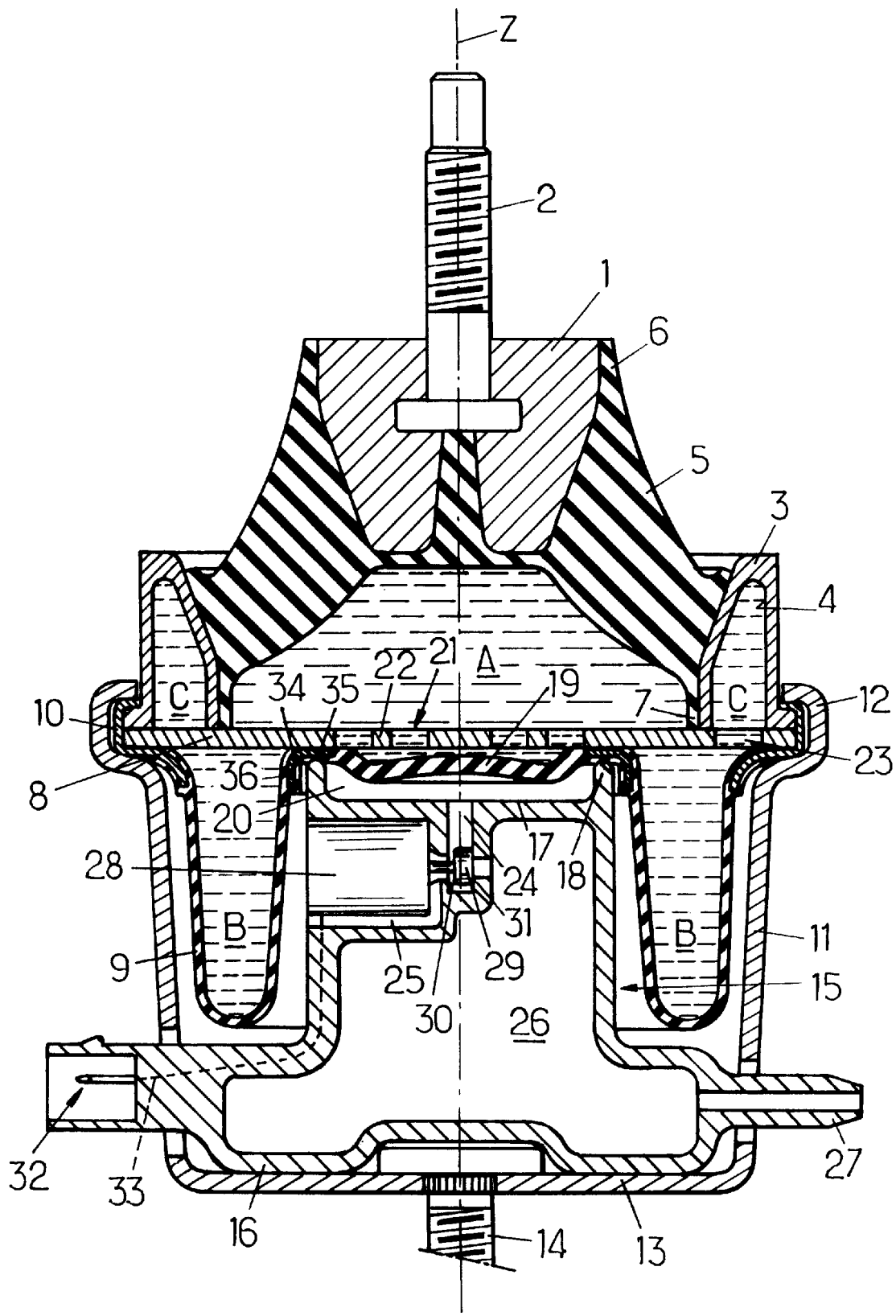

PNEUMATICALLY CONTROLLED, ACTIVE HYDRAULIC ANTI-VIBRATION SUPPORT

FIELD OF THE INVENTION

The present invention relates to the pneumatically controlled, hydraulic anti-vibration supports, specifically designed to support the engines of motor vehicles.

Various pneumatically controlled, hydraulic anti-vibration supports are known and are either controllable supports (i.e. of variable stiffness) such as those disclosed in document EP-A-0 262 544, or active supports (i.e. producing counter-vibrations intended to cancel out the effects of the engine vibrations) such as those disclosed in document JP-A-9 317 815.

BACKGROUND OF THE INVENTION

Of these known supports, the invention relates more specifically to a pneumatically controlled, active hydraulic anti-vibration support designed to be inserted between two rigid elements and comprising:
- first and second rigid frames designed to be joined respectively to the two rigid elements to be connected,
- an elastomer body linking the two frames to one another and partially delimiting a working chamber filled with liquid,
- a flexible wall, partially delimiting a compensation chamber filled with liquid, which is in turn connected to the working chamber by a throttled passage, also filled with liquid,
- a rigid partition which is joined to the second frame and which partially delimits the working chamber, this rigid partition having a mouthpiece closed off by means of a flexible membrane, said membrane having a first face communicating with the working chamber and a second face isolated from said working chamber,
- a pneumatic chamber partially delimited by the second face of the membrane,
- and at least one solenoid to provide communication between the pneumatic chamber and the atmosphere and/or with a coupling providing a connection to a pneumatic source, said solenoid being connected to an electrical connector in turn designed to be connected to an electronic control system.

An anti-vibration support of this type is fitted in particular on the HARRIER vehicle sold by TOYOTA. In this known support, counter-vibrations are emitted in the working chamber at the idling frequencies of the engine by activating the solenoid so as to connect the pneumatic chamber alternately with the atmosphere and with the pneumatic source (in practice, a vacuum source formed by the air admission circuit of the engine).

This known anti-vibration support has the disadvantage of being relatively complex and expensive.

OBJECTS AND SUMMARY OF THE INVENTION

The objective of the present invention is to overcome this disadvantage.

To this end, the invention proposes a hydraulic anti-vibration support of the type in question, essentially characterised in that it has a single-block, pneumatic actuating unit which incorporates:
- a rigid support block joined to the second frame,
- the solenoid,
- the pneumatic coupling,
- and the electrical connector,
the support block having an annular flange which partially delimits the pneumatic chamber and this support block being applied against the rigid partition clamping the flexible membrane between said annular flange and said rigid partition, this annular flange being disposed around the mouthpiece of the rigid partition.

As a result of these features, the electrical and pneumatic elements of the anti-vibration support are integrated in the single-block pneumatic unit, which helps to facilitate assembly of these elements in the anti-vibration support and reduce the cost and complexity of this support.

The complexity of the anti-vibration support is reduced still further due to the fact that the actual mounting of the single-block pneumatic unit makes it possible to produce:
- the sealed contact between the flexible membrane and the partition of the working chamber,
- and/or the sealed closure of the pneumatic chamber.

Furthermore, the anti-vibration support itself forms a single-block unit, which takes up less room and is easy to mount in the vehicle since it merely has to be fitted in the same manner as a conventional anti-vibration support and linked up to the pneumatic coupling and the electrical connector.

Finally, because the pneumatic actuating unit is so compact, the pneumatic pipes are shorter than in the TOYOTA support and the anti-vibration support can be controlled, as required, at higher frequencies than the idling frequencies, which means that counter-vibrations can also be emitted when the vehicle is travelling.

In the preferred embodiments of the invention, it may also be possible to use one and/or the other of the following designs:
- the elastomer body is of a bell shape extending between a top integral with the first frame on the one hand and an annular base integral with the second frame on the other, the pneumatic actuating unit being contained in a rigid casing which is arranged opposing the elastomer body relative to the rigid partition, this casing being permanently joined to the second frame and to said rigid partition by applying the base of the elastomer body to the rigid partition, whilst the support block of the pneumatic actuating unit is retained between the casing and the rigid partition so that the annular flange of said support block is applied against the flexible membrane and the rigid partition;
- the compensating chamber is also arranged inside the casing;
- the membrane consists of a central part belonging to the flexible wall of the compensating chamber, said compensating chamber being annular in shape and being disposed around the pneumatic actuating unit;
- the flexible wall of the compensating chamber has a peripheral, metal reinforcing frame which is crimped onto the rigid partition and onto the second frame, pressing said second frame and the base of the elastomer body against the rigid partition;
- the casing is metal and is crimped on top of the peripheral reinforcing frame of the flexible wall;
- the flexible wall of the compensating chamber has, around its central part forming the flexible membrane, a rigid central frame which is embedded in said flexible wall and which has:
  an annular bearing face which is parallel with the rigid partition and which is retained between said rigid partition and the annular flange of the support block of the pneumatic actuating unit, and an annular flange which extends perpendicularly to the rigid partition around said annular flange of the support block, the second frame forms a hollow crown which is open towards the rigid partition, delimiting the throttled passage in conjunction with said rigid partition;

the support block of the pneumatic actuating unit also has a buffer reservoir inserted between the pneumatic coupling and the pneumatic chamber;

the dimensions of the mouthpiece are such as to produce a natural resonance frequency of between 20 and 80 Hz;

the single-block pneumatic actuating unit has an air passage which connects the solenoid to the pneumatic chamber and which is so dimensioned as to have a natural resonance frequency ranging between 20 and 80 Hz.

BRIEF DESCRIPTION OF THE DRAWING

Other features and advantages of the invention will become clear from the following description of one of its embodiments, given by way of illustration and not restrictive in any respect, with reference to the appended drawing.

The drawing is a single diagram showing a view in axial cross-section of one embodiment of an anti-vibration support as proposed by the invention.

MORE DETAILED DESCRIPTION

Throughout the description, terms such as "top", "bottom", "lower", "upper", "horizontal", "vertical" are used solely as a means of improving clarity of the description by reference to the most common position in which the device proposed by the invention is used but these terms are not restrictive.

The hydraulic anti-vibration device illustrated in the drawing comprises:

- a first frame 1 shaped to provide a rigid metal base joined to a bolt 2 which is upwardly directed along a vertical axis Z and which is designed to be fixed to the engine block of a vehicle, for example,
- a second frame 3 in the shape of a rigid metal crown centred on the axis Z, this crown being hollow and delimiting on the inside a groove 4 which is open towards the bottom and which extends at an angle across a part of the circumference of the crown 3,
- an elastomer body 5 having a relatively high compression strength, this elastomer body being of a bell shape which extends between a top 6 integral with the base 1 and an annular base 7 which is joined to the crown 3,
- a rigid partition 8 in the form of a flat horizontal sheet-metal plate which is applied tightly against the base 7 of the elastomer body and against the metal crown 3,
- a flexible wall 9 made from elastomer, the external periphery of which is reinforced by means of a metal frame 10 crimped onto the crown 3 and the rigid partition 8, so as to clamp these two parts one against the other forming a tight seal,
- a sheet-metal casing 11, the edge 12 of which is crimped onto the peripheral reinforcing frame 10, thereby joining the casing 11 to the crown 3 and the rigid partition 8, the casing 11 having a base 13 joined to a bolt 14 designed to be fixed to the chassis of the vehicle, for example,
- and a single-block pneumatic actuating unit 15 which is arranged inside the casing 11.

The pneumatic actuating unit 15 consists of a rigid support block 16 having at its upper part a head 17 delimited by an annular flange 18 of said block.

This annular flange 18 lifts the central part of the flexible elastomer wall 9, clamping the periphery of this central part against the bottom face of the rigid partition 8, the entire supporting block 16 itself being clamped between said central part of the flexible wall 9 and the base 13 of the casing 11.

Accordingly, the central part of the flexible elastomer wall forms a flexible membrane 19 which, in conjunction with the head 17, delimits towards the bottom a pneumatic chamber 20.

Advantageously, the flexible elastomer wall 9 is reinforced by means of a central annular frame 34 which is embedded in said flexible wall and which has:

- an annular bearing face 35 which is parallel with the rigid partition 8 and which is clamped between said rigid partition and the annular flange 18,
- and an annular flange 36 which extends perpendicularly to the rigid partition around the annular flange 18 of the support block 16, thereby ensuring that the flexible wall 9 is correctly centred.

In addition, the rigid partition 8 has a central mouthpiece 21 coinciding with the flexible membrane 19 to the centre of the annular flange 18. This mouthpiece 21, which is provided with a grate 22 limiting displacements of the membrane, places the upper face of said membrane 19 in contact with a working chamber A filled with liquid, contained between the elastomer body 5 and the rigid partition 8.

This working chamber communicates, via a radial opening (not illustrated) provided in the crown 3, with a throttled passage C filled with liquid and contained between the groove 4 of the crown 3 and the rigid partition 8.

Via an orifice 23, the throttled passage C communicates with an annular compensating chamber B filled with liquid, which is contained between the rigid partition 8 and the radially external part of the flexible elastomer wall 9, this compensating chamber being disposed around the upper part of the support block 16.

Furthermore, the pneumatic chamber 20 communicates with a central shaft 24 bored through the support block 16, said central shaft communicating on the one hand with a passage 25 to the atmosphere and on the other with a buffer reservoir 26. This reservoir in turn communicates with a pneumatic coupling 27 into which a flexible hose can be connected, linked to the air admission circuit of the engine or any other pneumatic source (vacuum source or possibly even a tank of compressed gas).

The buffer reservoir 26 enables pressure fluctuations in the air admission circuit to be filtered.

Communication between the pneumatic chamber 20 on the one hand and the passage to the atmosphere 25 and the reservoir 26 on the other is controlled by means of a solenoid 28.

When the solenoid is not activated, the flap 29 of this solenoid is applied against a first valve seat 30, in which case the pneumatic chamber 20 is isolated from the atmosphere and placed under vacuum.

When the solenoid 28 is activated, on the other hand, the flap 29 is applied against a second valve seat 31 (the position illustrated in the drawing), opening the pneumatic chamber 20 to the atmosphere and isolating the reservoir 26 (not illustrated).

The solenoid 28 is connected to an electrical connector 32 by means of one or more cables 33, which enables the solenoid 28 to be controlled by the engine control system of the motor vehicle.

The device described above operates as follows.

Whilst the vehicle is travelling, the control computer leaves the solenoid 28 in the rest position so that the pneumatic chamber 20 is kept under vacuum. The flexible membrane 19 is therefore applied against the base of the head 17 and is not involved in operation of the anti-vibration support.

In this layout, the anti-vibration support therefore operates in a conventional manner, damping low frequency vibratory movements (for example below 20 Hz and generally in the order of 10 Hz) between the engine block and the chassis of the vehicle because of the transfers of liquid taking place between the working chamber A and the compensating chamber B through the throttled passage C.

Furthermore, when the engine is idling, the engine control computer controls the solenoid 28, displacing the flap 29 alternately between the first and second valve seats 30 and 31, at the frequency of the engine's explosions (generally from 20 to 40 Hz in the case of a four-cylinder engine and up to 80 Hz in the case of an eight-cylinder engine).

This causes pressure fluctuations in the pneumatic chamber 20 so that the flexible membrane 19 is moved about by vibratory movements which transmit counter-vibrations towards the working chamber A intended to neutralise the effects of the engine's vibrations.

The counter-vibrations emitted by the flexible membrane 19 are optimised by the computer on the basis of a programme predetermined to suit the engine system and various parameters which may affect the idling vibrations (operation of the air-conditioning system, power consumption, engine temperature, etc.) by acting on the following parameters:

the amplitude of the vibrations of the membrane 19, which is controlled by acting on the cyclic ratio of the signal sent to the solenoid (ratio between the effective control time of the solenoid 28 and the total duration of a vibration period), the phase of the vibrations of the membrane 19, controlled by acting on the initial instant of each actuation cycle of the solenoid 28 relative to the engine speed, detected as a given cylinder passes its top dead centre.

Clearly, the invention is not limited to the embodiment described here and may incorporate other embodiments, in particular ones in which:

the solenoid 28 places the pneumatic chamber 20 in contact with the atmosphere when said solenoid is in the rest position, the solenoid 28 no longer operates in binary mode but on a proportional operating basis enabling the exact position of the flap 29 between the two valve seats 30, 31 to be controlled, thereby allowing the pressure in the pneumatic chamber 20 to be more finely controlled, the pneumatic coupling 27 is also the electrical control connector for the solenoid 28 so that only a single branch need be provided when fitting the anti-vibration support, the compensating chamber B is disposed on the "top" face of the partition 8 in a layout similar to that disclosed in document EP-A-0 646 735, and the solenoid 28 is activated so as to cause counter-vibrations to be emitted by the membrane 19 when the vehicle is travelling, i.e. at frequencies higher than the idling frequency.

Optionally, in order to increase the efficiency of the membrane 19 in damping the engine vibrations, it is possible to modify the shape of the mouthpiece 21 so as to reduce the passage section and increase the length so that this mouthpiece will become the source of resonance phenomena similar to those generated in the throttled passage C but at a higher frequency, preferably corresponding to the idling frequency of the engine. This being the case, the natural frequency of the mouthpiece 21 will preferably be between 20 and 80 Hz.

With the same aim in mind, it is also possible to dimension the central shaft 24 or provide an air passage of a different shape (longer and with a smaller passage section) between the flap 29 of the solenoid and the pneumatic chamber 20 so that this central shaft 24 or this air passage is the source of resonance phenomena at the idling frequency of the engine, in which case the natural frequency of said shaft 24 or said air passage will preferably be between 20 and 80 Hz.

We claim:

1. A pneumatically controlled, active hydraulic anti-vibration support, designed to be inserted between two rigid elements and comprising:

first and second rigid frames designed to be joined respectively to the two rigid elements to be connected, an elastomer body linking the two frames to one another and partially delimiting a working chamber filled with liquid, a flexible wall, partially delimiting a compensating chamber filled with liquid, which is in turn connected to the working chamber by a throttled passage, also filled with liquid, a rigid partition which is joined to the second frame and which partially delimits the working chamber, this rigid partition having a mouthpiece closed off by means of a flexible membrane, this membrane having a first face communicating with the working chamber and a second face isolated from said working chamber, a pneumatic chamber partially delimited by the second face of the membrane, and at least one solenoid to provide communication between the pneumatic chamber and the atmosphere and with a coupling providing a connection to a pneumatic source, said solenoid being connected to an electrical connector in turn designed to be connected to an electronic control system, said anti-vibration support having a single-block, pneumatic actuating unit which incorporates:

a rigid support block joined to the second frame, the solenoid, the pneumatic coupling, and the electrical connector, the support block having an annular flange which partially delimits the pneumatic chamber and this support block being applied against the rigid partition clamping the flexible membrane between said annular flange and said rigid partition, this annular flange being disposed around the mouthpiece of the rigid partition.

2. An anti-vibration support as claimed in claim 1, wherein the elastomer body is of a bell shape extending between a top integral with the first frame on the one hand and an annular base integral with the second frame on the other, the pneumatic actuating unit being contained in a rigid casing which is arranged opposing the elastomer body relative to the rigid partition, this casing being permanently joined to the second frame and to said rigid partition by applying the base of the elastomer body to the rigid partition, whilst the support block of the pneumatic actuating unit is retained between the casing and the rigid partition so that the annular flange of said support block is applied against the flexible membrane and the rigid partition.

3. An anti-vibration support as claimed in claim 2, wherein the compensating chamber is also disposed inside the casing.

4. An anti-vibration support as claimed in claim 3, wherein the membrane is formed by a central part belonging to the flexible wall of the compensating chamber, said compensating chamber being annular in shape and being disposed around the pneumatic actuating unit.

5. An anti-vibration support as claimed in claim 4, wherein the flexible wall of the compensating chamber has a peripheral metal reinforcing frame which is crimped onto the rigid partition and onto the second frame, pressing said second frame and the base of the elastomer body against the rigid partition.

6. An anti-vibration support as claimed in claim 5, wherein the casing is metal and is crimped on top of the peripheral reinforcing frame of the flexible wall.

7. An anti-vibration support as claimed in claim 4, wherein the flexible wall of the compensating chamber has, around its central part forming the flexible membrane a rigid central frame which is embedded in said flexible wall and which has:

an annular bearing face which is parallel with the rigid partition and which is clamped between said rigid partition and the annular flange of the support block of the pneumatic actuating unit, and an annular flange extending perpendicularly to the rigid partition around said annular flange of the support block.

8. An anti-vibration support as claimed in claim 2, wherein the second frame forms a hollow crown open towards the rigid partition, delimiting the throttled passage in conjunction with said rigid partition.

9. An anti-vibration support as claimed in claim 1, wherein the support block of the pneumatic actuating unit also has a buffer reservoir inserted between the pneumatic coupling and the pneumatic chamber.

10. An anti-vibration support as claimed in claim 1, wherein the mouthpiece is dimensioned so as to have a natural resonance frequency ranging between 20 and 80 Hz.

11. An anti-vibration support as claimed in claim 1, wherein the single-block, pneumatic actuating unit has an air passage which links the solenoid to the pneumatic chamber and which is dimensioned so as to have a natural resonance frequency ranging between 20 and 80 Hz.

* * * * *